United States Patent Office 2,993,936
Patented July 25, 1961

1

2,993,936
ALPHA-PHENYL BETA-TRINITROETHANOL
Robert H. Saunders, West Chester, Pa., assignor, by mesne assignments, to the United States of America as represented by the Secretary of the Navy
No Drawing. Filed May 7, 1952, Ser. No. 286,604
1 Claim. (Cl. 260—645)

This invention relates to a new compound, α-phenyl β-trinitroethanol.

The new compound of the invention is a white crystalline solid which is stable at room temperature. It has properties making its use as an explosive highly feasible. For example, it has an oxygen balance within permissible limits and a sensitivity to impact slightly less than that of tetryl.

It is an object of the invention to provide a new explosive compond, α-phenyl β-trinitroethanol.

The new compound may be prepared by reacting nitroform with benzaldehyde.

The invention is illustrated by the following example, but is not limited thereto.

*Example*

530 milligrams of benzaldehyde were added slowly with stirring to 760 milligrams of nitroform and the mixture heated for one hour at 64° C. A white crystalline product was obtained by recrystallization from methanol-water solution.

2

The new compound has the following formula:

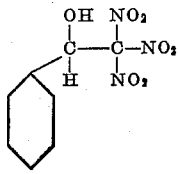

The percentage composition calculated for $C_8H_7N_3O_7$ is 37.3 percent carbon, 2.7 percent hydrogen, 16.3 percent nitrogen and the remainder oxygen. Analysis of the compound gave 39.3 percent carbon, 3.3 percent hydrogen and 16.5 percent nitrogen.

The compound has an oxygen balance of —78. Its melting point is 78° C. It has an impact sensitivity of 60 as determined with the Bureau of Mines impact machine, this figure being the distance in centimeters a 2 kilogram weight was required to fall in order to produce 50% shots. The compound gave a time of 5 minutes at 82.2° C. with the potassium iodide-starch stability test.

It is thus seen that there has been provided a new compound having properties making its utility as an exposive highly feasible.

What is claimed is:
α-phenyl β-trinitroethanol.

References Cited in the file of this patent
UNITED STATES PATENTS
2,397,802     Muller _____ Apr. 2, 1946